(12) United States Patent
Wang et al.

(10) Patent No.: US 11,082,002 B2
(45) Date of Patent: Aug. 3, 2021

(54) SOLAR CELL ASSEMBLY AND SOLAR CELL MODULE

(71) Applicant: BYD COMPANY LIMITED, Guangdong (CN)

(72) Inventors: Shencun Wang, Shenzhen (CN); Jinxin Xue, Shenzhen (CN); Xiang Sun, Shenzhen (CN); Chen Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 29 days.

(21) Appl. No.: 16/007,493

(22) Filed: Jun. 13, 2018

(65) Prior Publication Data

US 2018/0294768 A1 Oct. 11, 2018

Related U.S. Application Data

(63) Continuation of application No. PCT/CN2016/111819, filed on Dec. 23, 2016.

(30) Foreign Application Priority Data

Dec. 29, 2015 (CN) .......................... 201521126491.0

(51) Int. Cl.
*H02S 30/10* (2014.01)
*H02S 20/10* (2014.01)
(Continued)

(52) U.S. Cl.
CPC ............ *H02S 30/10* (2014.12); *F24S 25/632* (2018.05); *F24S 25/67* (2018.05); *H02S 20/00* (2013.01);
(Continued)

(58) Field of Classification Search
CPC ..... H02S 30/10; H02S 20/10; H01L 31/0203; H01L 31/0232; H01L 31/042; H01L 31/048; H01L 31/049
See application file for complete search history.

(56) References Cited

U.S. PATENT DOCUMENTS 4,239,555 A * 12/1980 Scharlack ............. H01L 31/048
136/251
2009/0325072 A1* 12/2009 Maeda .................. H01M 4/364
429/220

(Continued)

FOREIGN PATENT DOCUMENTS

CN 202564391 U 11/2012
CN 202839660 U 3/2013
(Continued)

OTHER PUBLICATIONS

International Search Report and Written Opinion for Application No. PCT/CN2016/111819, dated Apr. 6, 2017, 8 pages.

*Primary Examiner* — Golam Mowla

(57) ABSTRACT

A solar cell assembly and a solar cell module are provided. The solar cell assembly includes a solar panel; and an installation member having a supporting portion configured for fixing the solar panel and a connecting portion configured for fixing the installation member onto a support beam. The supporting portion is disposed on a backside of the solar panel, the connecting portion extends out of an edge of the supporting portion along a direction parallel to the solar panel, the connecting portion locates outside of a coverage area of the solar panel, and the connecting portion defines a installation hole therein.

12 Claims, 4 Drawing Sheets

(51) Int. Cl.
*H02S 20/00* (2014.01)
*F24S 25/632* (2018.01)
*F24S 25/67* (2018.01)
*F24S 25/60* (2018.01)

(52) U.S. Cl.
CPC ....... H02S 20/10 (2014.12); *F24S 2025/6006* (2018.05); *Y02E 10/47* (2013.01); *Y02E 10/50* (2013.01)

(56) References Cited

U.S. PATENT DOCUMENTS

| | | |
|---|---|---|
| 2011/0146761 A1 | 6/2011 | Yang et al. |
| 2014/0290717 A1 | 10/2014 | Chiu |
| 2015/0288320 A1 | 10/2015 | Stearns et al. |

FOREIGN PATENT DOCUMENTS

| | | |
|---|---|---|
| CN | 105162386 A | 12/2015 |
| CN | 205453595 U | 8/2016 |
| WO | 2010/124529 A1 | 11/2010 |

\* cited by examiner

SOLAR CELL ASSEMBLY AND SOLAR CELL MODULE

CROSS-REFERENCE TO RELATED APPLICATION

This application is a continuation application of International Patent Application No. PCT/CN2016/111819, filed on Dec. 23, 2016, which claims priority to and benefits of Chinese Patent Application Serial No. 201521126491.0, filed with the State Intellectual Property Office (SIPO) of P. R. China on Dec. 29, 2015. The entire contents of the above mentioned applications are incorporated herein by reference.

FIELD

The present disclosure generally relates to field of solar cell, especially relates to a solar cell assembly and a solar cell module.

BACKGROUND

As shown in FIG. 1, a conventional solar panel is mainly installed via a clamping assembly which is made of aluminum, the clamping assembly mainly includes an upper clamp 1 and a lower clamp 2, both the upper clamp 1 and the lower clamp 2 have a groove for installing a rubber pad 3, the upper clamp 1 and the lower clamp 2 are connected with each other through a bolt, and the solar panel is clamped by the clamping assembly at two sides via the rubber pad 3. The clamping assembly could be fixed onto an installation bracket. However, there are some disadvantages existing in this kind of clamping assembly: on one hand, the rubber pad may be aged under ultraviolet ray, water vapor and corrosion gases, which may reduce a clamp force applied to the solar panel, the solar panel may drop off; on the other hand, this kind of clamping assembly may have poor resistance against air pressure and snow pressure. In addition, a double-glass solar cell assembly is fixed under a friction force between the rubber pad and the surface of glass, while the friction force between the rubber pad and the double-glass solar cell assembly is determined by a friction coefficient and a force applied via the bolt. When the a relatively high pressure is applied to the solar cell assembly, the solar cell assembly may be deformed and gradually slide out from the clamp assembly, then a moment of force on the clamp assembly may be increased gradually, therefore the clamp assembly may be deformed and damaged.

In addition, when disposing a fixing assembly on the back of the solar cell assembly, since the mounting point locates on the backside of the solar panel, a required accuracy of location of the fixing assembly and the support beam is relatively high, especially when the solar pane is near to the ground, a bolt cannot be screwed into the back of the solar panel, which may influence installation of the solar panel.

SUMMARY

The present disclosure seeks to solve at least one of the technical problems in the related art to some extent. To this end, the present disclosure provides a solar cell assembly and a solar cell module, an installation member is disposed on a solar panel, the installation member is mainly configured for fastening and fixing the solar panel and a support beam, which may increase safety of installation and a loading capacity of the solar panel, reduce requirement of installation accuracy and suitable for installation of varies support beams.

According to a first aspect of the present disclosure, a solar cell assembly is provided. The solar cell assembly includes a solar panel; and an installation member having a supporting portion configured for fixing the solar panel and a connecting portion configured for fixing the installation member onto a support beam. The supporting portion is disposed on a backside of the solar panel, the connecting portion extends out of an edge of the supporting portion along a direction parallel to the solar panel, the connecting portion locates outside of a coverage area of the solar panel, and the connecting portion defines an installation hole therein.

In some embodiments, there are multiple installation members disposed on two sides of the solar panel respectively.

In some embodiments, the supporting portion defines a platform surface thereon, an adhesive layer configured to combine with the backside of the solar panel is disposed on the platform surface.

In some embodiments, the supporting portion is configured as a hollow square tube having a cavity formed therein, and an upper surface of the hollow square tube is configured as the platform surface.

In some embodiments, the connecting portion is configured as a plate.

In some embodiments, a lower surface of the connecting portion is flush with a lower surface of the supporting portion.

In some embodiments, a first plane on which a lower surface of the connecting portion is located is higher than a second plane on which a lower surface of the supporting portion is located, and a distance between the first plane and the second plane is equal to a thickness of the connecting portion.

In some embodiments, the installation member further has a limiting portion disposed between the supporting portion and the connecting portion, and a side of the solar panel abuts against the limiting portion.

In some embodiments, the limiting portion has a bending portion formed on an end thereof far away from the supporting portion, the bending portion faces toward the solar panel, and an upper surface of the bending porting is parallel to an upper surface of the supporting portion.

In some embodiments, the installation hole is configured as a waist-like hole.

According to a second aspect of the present disclosure, a solar cell module is provided. The solar cell module includes a support beam and a solar cell assembly mentioned above, the support beam locates on the backside of the solar cell assembly, and the solar cell assembly is fixed on the support beam via the installation member.

In some embodiments, there are multiple solar cell assemblies disposed on the support beam side by side, the multiple solar cell assemblies comprises a first solar cell assembly and a second solar cell assembly adjacent to the first solar cell, the first solar cell assembly includes a first installation member, the second solar cell assembly includes a second installation member, the first installation member includes a first supporting portion and a first connecting portion, the first connecting portion defines a first installation hole thereon, a lower surface of the first connecting portion is flush with a lower surface of the first supporting portion; the second installation member includes a second supporting portion and a second connecting portion, the second connecting portion defines a second installation hole thereon, a first plane on which a lower surface of the second connecting portion is located is higher than a second plane on which a lower surface of the second supporting portion is located, and a distance between the first plane and the second plane is equal to a thickness of the first connecting portion; the first connecting portion is disposed on bottom of the second connecting portion and overlapped with the second connecting portion, the first installation hole and the second installation hole are overlapped, and a bolt passes through the second installation hole and the first installation hole in turn and is connected to the support beam.

With the solar cell assembly of the present disclosure, an installation member is disposed on the solar panel so as to realize connection between adjacent solar panels and between the solar panel and the support beam. The installation member may include a supporting portion, a limiting portion and a connecting portion, compared with a conventional side-clamping installation, the supporting portion is connected to the backside of the solar panel so as to provide a supporting force. The supporting portion is connected to the solar panel via adhesion. When an adhering area is large enough, a mechanical load that the solar panel could bear is greatly higher than that when the solar panel is installed via side-clamping. A connecting portion is disposed on the supporting portion along a direction away from the solar panel, thus a bolt could be fastened from a front side of the solar panel, which facilitates quick installation of the solar panel quickly and installation of the solar panel to the supporting beam close to the ground.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
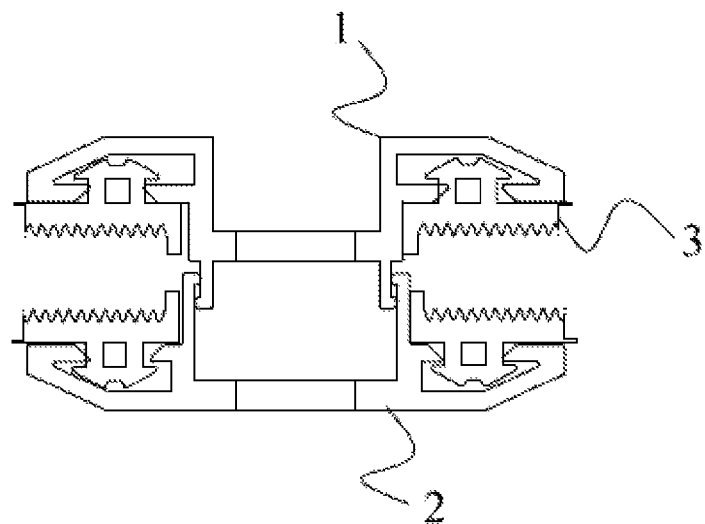
FIG. 1 is a schematic view of a mounting clamp of a solar panel in the prior art.

Embodiments of the present disclosure are described in detail below, and examples of the embodiments are shown in accompanying drawings. The following embodiments described by referring to the accompanying drawings are illustrative, aim at explaining the present disclosure, and should not be interpreted as limitations to the present disclosure.

In the specification, it is to be understood that terms such as "length," "width," "thickness," "upper," "lower," "front," "rear," "left," "right," "bottom," "inner," and "outer," should be construed to refer to the orientation as then described or as shown in the drawings under discussion. These relative terms are for convenience of description and do not require that the present disclosure be constructed or operated in a particular orientation. And in the specification, the term "multiple" means two or more than two, except as otherwise noted.

In the specification, it is to be understood that, unless specified or limited otherwise, terms such as "mounted," "connected," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Figure 2:
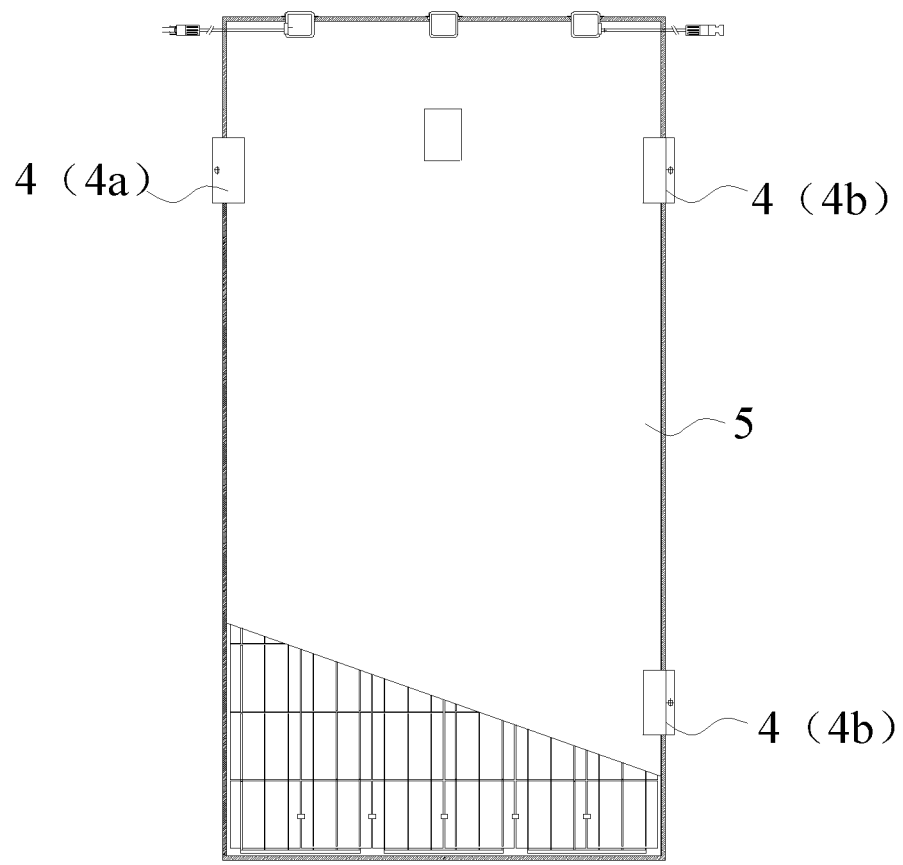
FIG. 2 is a schematic view of a solar cell assembly according to an embodiment of the present disclosure.
Figure 3:
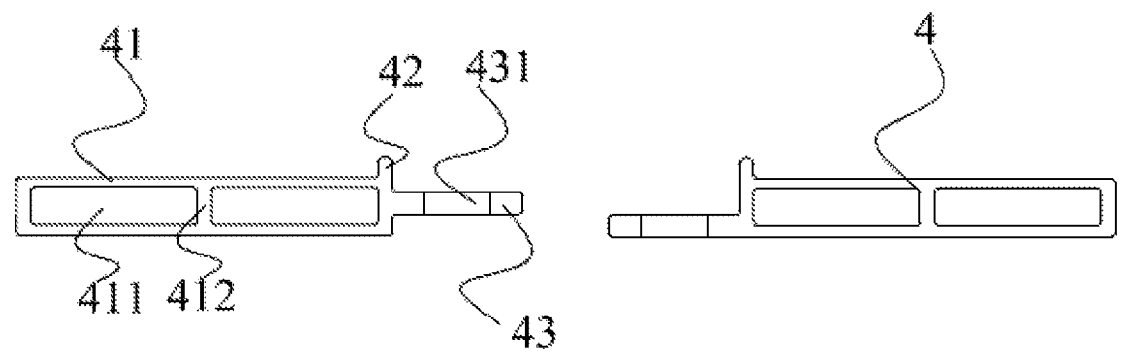
FIG. 3 is a schematic view of an installation member according to an embodiment of the present disclosure.

As shown in FIGS. 2 and 3, the present disclosure provides a solar cell assembly, which includes a solar panel 5 and an installation member 4, the installation member 4 has a supporting portion 41 configured for fixing the solar panel 5 and a connecting portion 43 configured for fixing the installation member 4 onto a support beam.

The supporting portion 41 is disposed on a backside of the solar panel 5, the connecting portion 43 extends out of an edge of the supporting portion 41 along a direction parallel to the solar panel 5. For example, in some embodiments, the connecting portion 43 and the supporting portion 41 are integrally formed, and the connecting portion 43 is disposed on a side edge of the supporting portion 41. The connecting portion 43 locates outside of a coverage area of the solar panel 5. It should be noted that the coverage area of the solar panel 5 refers to, when looking from a front side of the solar panel (namely a light receiving surface), an area that the solar panel 5 covers. That is, the connecting portion 43 locates outside of a side edge of the solar panel 5. Different installation members 4 could be connected with each other via the connecting portion 43. The connecting portion 43 defines an installation hole 431 therein. A bolt could be screwed down from the front side of the solar panel 5, which facilitates quick installation of the solar panel 5 and installation of the solar panel 5 to the supporting beam close to the ground.

In some embodiments, there may be multiple installation members 4 disposed on two sides of the solar panel 5 respectively. Then the solar panel 5 could be fixed stably.

Figure 4:
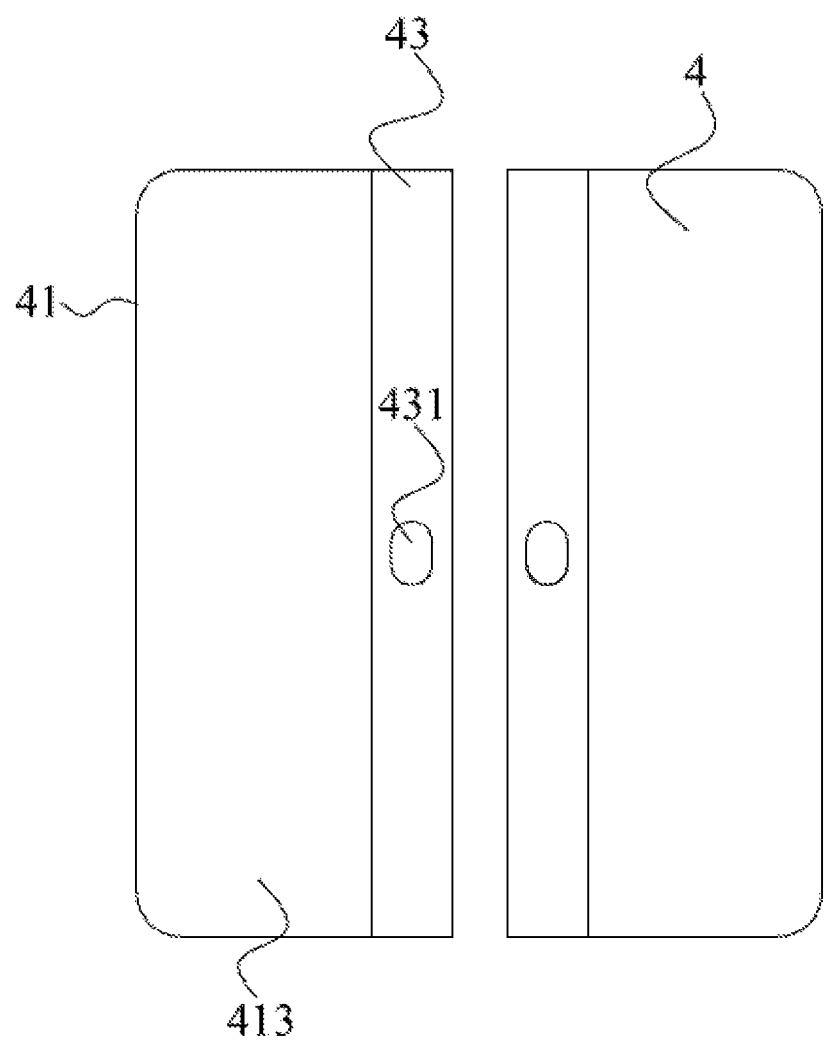
FIG. 4 is a top view of an installation member according to an embodiment of the present disclosure.

As shown in FIGS. 3 and 4, the installation member 4 may be disposed on the solar panel 5 so as to install and fix the solar panel 5 and the support beam.

The supporting portion 41 defines a platform surface 413 thereon, an adhesive layer (not shown) configured to combine with the backside of the solar panel 5 is disposed on the platform surface 413. The platform 413 of the supporting portion 41 is connected to the backside of the solar panel 5 so as to provide a supporting force. The supporting portion 41 is connected to the solar panel 5 via adhesion. When an adhering area is large enough, a mechanical load that the solar panel could bear is greatly higher than that when the solar panel is installed via clamping. Through an actual test, the solar panel 5 installed via the installation member of the present disclosure could bear a mechanical load higher than 5400 Pa.

Specifically, the supporting portion 41 is configured as a hollow square tube having a cavity 411 formed therein. A baffle plate 412 could be disposed in the hollow square tube so as to divide an inner space of the hollow square tube into a plurality cavities 411. An upper surface of the hollow square tube is configured as the platform surface 413, a surface of the hollow square tube away from the platform surface 413 is a lower surface of the hollow square tube. A length, a width and a thickness of the supporting portion 41 could be designed depending on a size and a load of the solar panel 5, and similarly, a number of the cavity 411 could also be designed depending on a load of the solar panel 5.

The installation member 4 could be made of, but not limited to, aluminum alloy, carbon steel or stainless steel.

The connecting portion 43 is configured as a plate that extending outside of a side of the supporting portion 41. In some embodiments, a corner of the connecting portion 43 is manufactured as a circular bead or a chamfer of 45 degrees, then a force applied to the corner of the connecting portion 43 may be reduced when the solar panel is deformed due to compression.

The installation member 4 further has a limiting portion 42 disposed between the supporting portion 41 and the connecting portion 43, for example the limiting portion 42 is configured as a stripe protrusion distributed at junction between the supporting portion 41 and the connecting portion 43. A side of the solar panel 5 abuts against the limiting portion 42 so as to position the solar panel 5, then deflection of the solar panel 5 may be avoided when the solar panel is adhered to the supporting portion 41.

Figure 5:
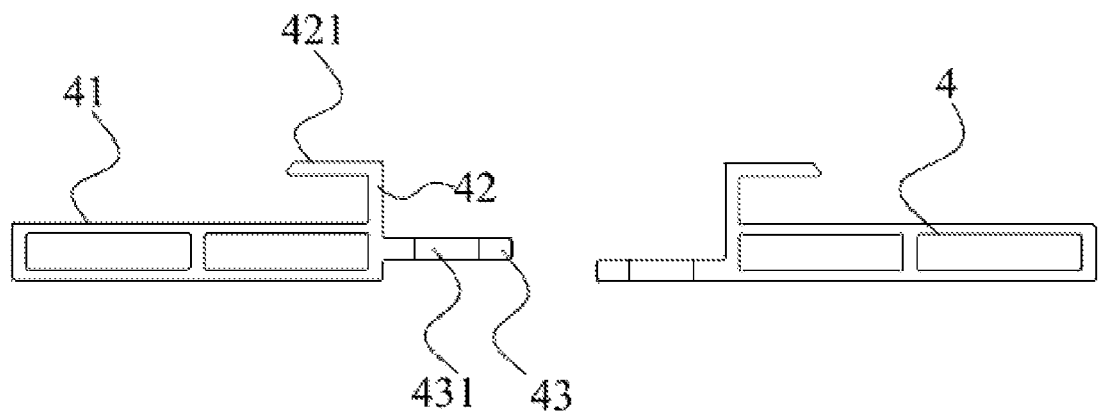
FIG. 5 is a schematic view of an installation member according to another embodiment of the present disclosure.

As shown in FIG. 5, in some embodiments, the limiting portion 42 has a bending portion 421 formed on an end thereof far away from the supporting portion 41, the bending portion 421 faces toward the solar panel 5, and the bending porting 421 is parallel to an upper surface of the supporting portion 41. That is, the bending porting 421 is parallel to the platform surface 413 so as to form a transverse limitation above the supporting portion 41. With a reverse limitation to the solar panel through the bending portion 421, ability of bearing a reverse load of the installation member 4 may be improved.

The adhesive layer is disposed between the installation member 4 and the solar panel 5 so as to fasten the solar panel 5 on the supporting portion 41 of the installation member 4. The adhesive layer could be made of single component silica gel, two-component silica gel, or epoxy resin, in some embodiments, the adhesive layer is made of silica gel (single component silica gel or two-component silica gel). It should be noted that other adhesive layers having the same function could also be adopted.

The installation hole 431 is configured as a waist-like hole. Two end of the waist-like hole are in the shape of a semi-arc, and two middle sides of the waist hole are parallel to each other. The waist-like hole allows position deviation larger than 5 millimeters, thus absorbing an installation deviation of the solar panel and the support beam so as to reduce a requirement of installation accuracy.

In some embodiments, a lower surface of the connecting portion 43 is flushed with a lower surface of the supporting portion 41. When the installation member is mounted on the support beam, the lower surface of the connecting portion 43 contacts the support beam.

In some embodiments, a first plane on which a lower surface of the connecting portion 43 is located is higher than a second plane on which a lower surface of the supporting portion 41 is located, and a distance between the first plane and the second plane is equal to a thickness of the connecting portion 43. The first plane is parallel to the second plane, i.e. the distance between the first plane and the second plane means a perpendicular distance between these two planes. When the installation member 4 is mounted on the support beam, a certain installation gap is formed between the first plane on which the lower surface of the connecting portion 43 is located, the installation gap is configured for accommodating a connecting portion of another solar cell assembly.

The two different arrangements of the connecting portion and the supporting portion could be implemented separately or corporately.

The present disclosure will be further described hereinafter by referring to Examples.

Example 1

This Example provides a solar cell module, which includes a support beam and a solar cell assembly. The solar cell assembly includes a solar panel 5 and an installation member 4. The support beam is disposed on a backside of the solar cell assembly 5, and the solar cell assembly is fixed on the support beam via the installation member 4.

There is one solar cell assembly, and multiple installation members 4 are disposed on two sides of the solar panel 5 respectively, a lower surface of the solar panel 5 is fastened to each installation member 4 via an adhesive layer, and an edge of the solar panel 5 abuts against an limiting portion 42, a bolt passes through an installation hole of the connecting portion 43 from its top, a tail end of the bolt is connected to the support beam so as to fix the solar cell assembly on the support beam.

Example 2

Figure 6:
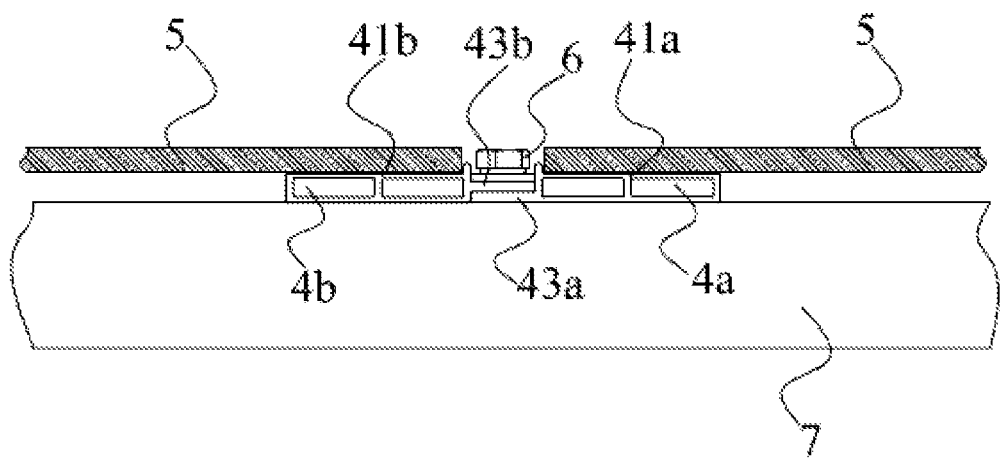
FIG. 6 is a schematic view of an installation structure according to an embodiment of the present disclosure.

As shown in FIG. 2 and with reference to FIG. 6, this Example provides a solar cell assembly, which includes a solar panel 5 and an installation member 4. The solar panel 5 is disposed on the installation member 4, a lower surface of the solar panel 5 is fastened to the installation member 4 via an adhesive layer, and an edge of the solar panel 5 abuts against a limiting portion 42.

The installation member 4 includes a first installation member 4a and a second installation member 4b, the first installation member 4a and the second installation member 4b are disposed on two sides of the solar panel 5 respectively. Preferably, two first installation members 4a are disposed on one side of the solar panel 5 and two second installation members 4b are disposed on the other side of the solar panel 5.

The first installation member 4a includes a first supporting portion 41a and a first connecting portion 43a, the first connecting portion 43a defines a first installation hole therein, a lower surface of the first connecting portion 43a is flush with a lower surface of the first supporting portion 41a.

The second installation member 4b includes a second supporting portion 41b and a second connecting portion 43b, the second connecting portion 43b defines a second installation hole therein, a first plane on which a lower surface of the second connecting portion 43b is located is higher than a second plane on which a lower surface of the second supporting portion 41b is located, and a distance between the first plane and the second plane is equal to a thickness of the first connecting portion 43.

Example 3

Figure 8:
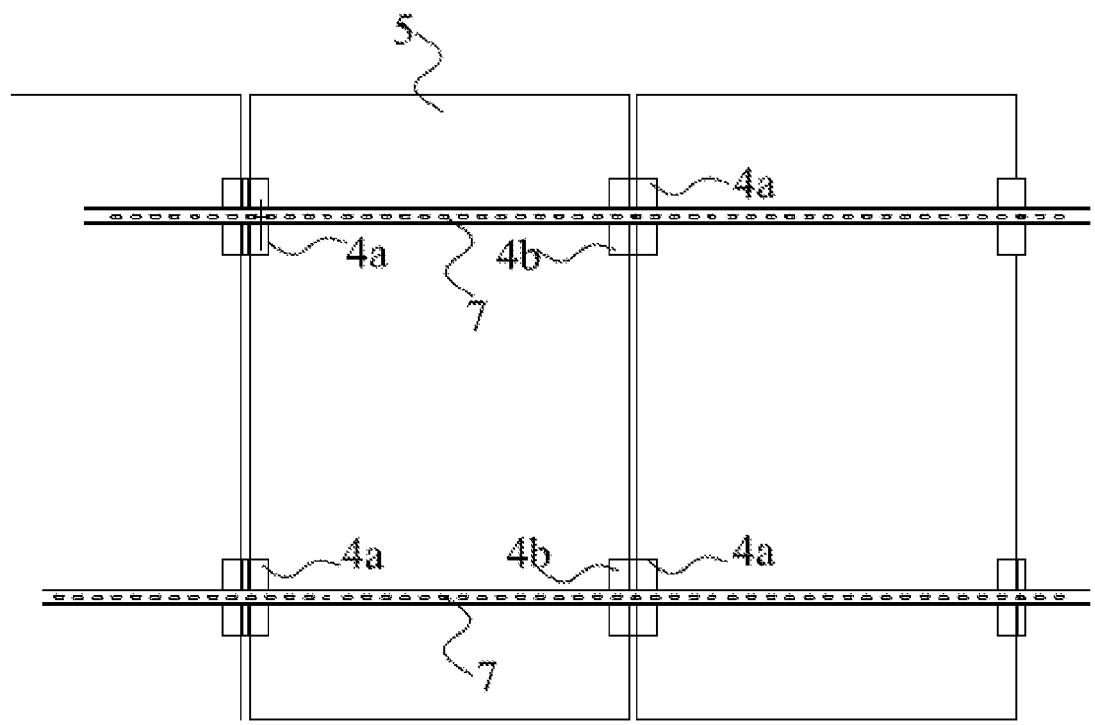
FIG. 8 is a schematic view of a solar cell module according to an embodiment of the present disclosure.

As shown in FIGS. 6 and 8, this Example provides a solar cell module, which includes a support beam 7 and multiple solar cell assemblies of Example 2. The support beam 7 is disposed on a backside of the solar cell assembly 5, and the solar cell assemblies are fixed on the support beam 7 via an installation member 4.

The multiple solar cell assemblies are disposed on the support beam 7 side by side, the multiple solar cell assemblies include a first solar cell assembly and a second solar cell assembly adjacent to the first solar cell assembly, the first solar cell assembly includes a first installation member 4a, the second solar cell assembly includes a second installation member 4b. The first solar cell assembly and the second cell assembly are connected with each other and mounted on the support beam 7 via the first installation member 4a and the second installation member 4b.

A first connecting portion 43a and a second connecting portion 43b are overlapped, and the first connecting portion 43a is accommodated in the installation gap on bottom of the second connecting portion 43b.

A bolt 6 passes through a second installation hole and a first installation hole in turn for fixation. And a tail end of the bolt 6 is connected to the support beam 7.

Example 4

Figure 7:
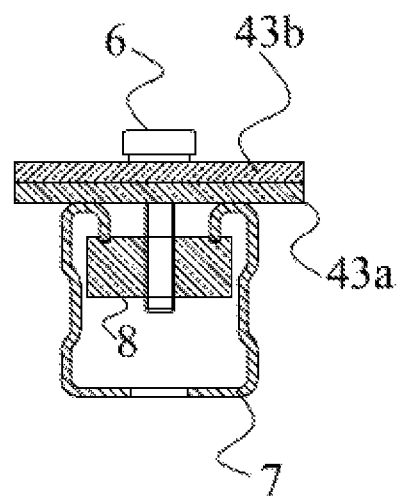
FIG. 7 is a sectional view of a joint portion between an installation member and a support beam according to an embodiment of the present disclosure.

As shown in FIG. 7, in this Example, the support beam is configured as a U shaped steel, the configuration of an installation member 4 and a solar panel 5 in this Example are the same as the Example 2, therefore detailed description is omitted.

An opening of the U shaped steel faces toward an overlapped position of the first connecting portion 43a and the second connecting portion 43b, two side walls of the U shaped steel bend inwardly to form a hook, a connecting piece 8 is disposed within the U shaped steel, and the connecting piece 8 has a threaded through hole formed therein.

When mounting the solar panel 5, the first installation member 4a and the second installation member 4b are adhered to two sides of each solar panel 5 respectively, then the connecting piece 8 is disposed within the U shaped steel, a distance between two adjacent connecting pieces 8 is regulated to be equal to a distance between the first installation member 4a and an adjacent second installation member 4b, and then the connecting piece 8 is fixed within the U shaped steel. Multiple solar panels 5 are disposed on the U shaped steel side by side, and a first installation member 4a of a first solar panel 5 and a second installation member 4b of a second solar panel 5 adjacent to the first solar panel 5 are connected and overlapped. The first installation hole, the second installation hole and the threaded through hole of each connecting pieces 8 are aligned with each other. A bolt 6 passes through the first and second installation holes from top, and a tail end of the bolt 6 is screwed into the connecting piece 8 so as to fasten the first installation member 4a and the second installation member 4b onto the U shaped steel to finish mounting of the solar panel 5.

Example 5

In this Example, the support beam is configured as a C shaped steel, the configuration of an installation member 4 and a solar panel 4 in this Example are the same as the Example 2, therefore detailed description is omitted.

The C shaped steel has a mounting through hole in the top thereof.

When mounting the solar panel 5, the first installation member 4a and the second installation member 4b are adhered to two sides of each solar panel 5 respectively, then multiple solar panels 5 are disposed on the C shaped steel side by side, and a first installation member 4a of a first solar panel 5 and a second installation member 4b of a second solar panel 5 adjacent to the first solar panel 5 are connected and overlapped. The first installation hole, the second installation hole and the mounting through hole of the C shaped steel are aligned with each other. A bolt enters from an opening of the C shaped steel and passes through the mounting through hole, the first installation hole and the and second installation hole in turn, and a tail end of the bolt is disposed above the first installation member 4a and the second installation member 4b, and then the bolt is fastened via a nut so as to fasten the first installation member 4a and the second installation member 4b onto the C shaped steel to finish mounting of the solar panel 5.

Although the embodiments of the present disclosure have been shown and described, those of ordinary skill in the art can understand that multiple changes, modifications, replacements, and variations may be made to these embodiments without departing from the principle and purpose of the present disclosure.

The invention claimed is:

1. A solar cell assembly, comprising:
   a solar panel; and
   an installation member having a supporting portion configured for fixing the solar panel and a connecting portion configured for fixing the installation member onto a support beam;
   wherein the supporting portion has a hollow square tube, a backside of the solar panel is disposed on an upper surface of the hollow square tube, and a baffle plate is disposed in the hollow square tube and divides an inner space of the hollow square tube into a plurality of cavities,
   wherein the installation member is not fixed on a frontside of the solar panel such that an entire frontside of the solar panel is fully exposed, and
   wherein the connecting portion extends out of an edge of the supporting portion along a direction parallel to the solar panel, the connecting portion locates outside of a coverage area of the solar panel, and the connecting portion defines an installation hole therein.

2. The solar cell assembly of claim 1, wherein there are multiple installation members disposed on two sides of the solar panel respectively.

3. The solar cell assembly of claim 1, wherein the supporting portion defines a platform surface thereon, an adhesive layer configured to combine with the backside of the solar panel is disposed on the platform surface.

4. The solar cell assembly of claim 3, wherein an upper surface of the hollow square tube is configured as the platform surface.

5. The solar cell assembly of claim 1, wherein the connecting portion is configured as a plate.

6. The solar cell assembly of claim 4, wherein a lower surface of the connecting portion is flush with a lower surface of the supporting portion.

7. The solar cell assembly of claim 4, wherein a first plane on which a lower surface of the connecting portion is located is higher than a second plane on which a lower surface of the supporting portion is located, and a distance between the first plane and the second plane is equal to a thickness of the connecting portion.

8. The solar cell assembly of claim 1, wherein the installation member further comprises a limiting portion disposed between the supporting portion and the connecting portion, and a side of the solar panel abuts against the limiting portion.

9. The solar cell assembly of claim 8, wherein the limiting portion has a bending portion formed on an end thereof far away from the supporting portion, the bending portion faces toward the solar panel, and the bending porting is parallel to an upper surface of the supporting portion.

10. The solar cell assembly of claim 1, wherein the installation hole is configured as a waist-like hole.

11. A solar cell module, comprising a support beam and a solar cell assembly,
wherein the solar cell assembly comprises:
a solar panel; and
an installation member having a supporting portion configured for fixing the solar panel and a connecting portion configured for fixing the installation member onto the support beam;
wherein the supporting portion has a hollow square tube, a backside of the solar panel is disposed on an upper surface of the hollow square tube, and a baffle plate is disposed in the hollow square tube and divides an inner space of the hollow square tube into a plurality of cavities,
wherein the installation member is not fixed on a frontside of the solar panel such that an entire frontside of the solar panel is fully exposed, and
wherein the connecting portion extends out of an edge of the supporting portion along a direction parallel to the solar panel, the connecting portion locates outside of a coverage area of the solar panel, and the connecting portion defines an installation hole therein; and wherein the support beam locates on the backside of the solar cell assembly, and the solar cell assembly is fixed on the support beam via the installation member.

12. The solar cell module of claim 11, wherein there are multiple solar cell assemblies disposed on the support beam side by side, the multiple solar cell assemblies comprises a first solar cell assembly and a second solar cell assembly adjacent to the first solar cell assembly, the first solar cell assembly comprises a first installation member, the second solar cell assembly includes a second installation member,
the first installation member includes a first supporting portion and a first connecting portion, the first connecting portion defines a first installation hole thereon, a lower surface of the first connecting portion is flush with a lower surface of the first supporting portion;
the second installation member includes a second supporting portion and a second connecting portion, the second connecting portion defines a second installation hole thereon, a first plane on which a lower surface of the second connecting portion is located is higher than a second plane on which a lower surface of the second supporting portion is located, and a distance between the first plane and the second plane is equal to a thickness of the first connecting portion; and
the first connecting portion is disposed on bottom of the second connecting portion and overlapped with the second connecting portion, the first installation hole and the second installation hole are overlapped, and a bolt passes through the second installation hole and the first installation hole in turn and is connected to the support beam.

* * * * *